US010834538B1

(12) United States Patent
Tkac et al.

(10) Patent No.: US 10,834,538 B1
(45) Date of Patent: Nov. 10, 2020

(54) LOCATING A MOBILE DEVICE AND NOTIFYING A USER OF THE MOBILE DEVICE LOCATION

(71) Applicant: International Business Machines Corporation, Armonk, NY (US)

(72) Inventors: Vincent Tkac, Delaware, OH (US); Joshua M. Rice, Marysville, OH (US); Andrew C. Myers, Columbus, OH (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/788,380

(22) Filed: Feb. 12, 2020

(51) Int. Cl.
*H04W 24/00* (2009.01)
*H04W 4/029* (2018.01)
*G06Q 30/02* (2012.01)

(52) U.S. Cl.
CPC ........ *H04W 4/029* (2018.02); *G06Q 30/0251* (2013.01)

(58) Field of Classification Search
USPC .............. 455/456.1, 456.3, 457, 414.2, 440; 701/465
See application file for complete search history.

(56) References Cited

U.S. PATENT DOCUMENTS

| | | | |
|---|---|---|---|
| 8,264,352 B2 | 9/2012 | Holley et al. | |
| 8,773,275 B1 | 7/2014 | Parenteau et al. | |
| 9,117,373 B2 * | 8/2015 | Hatton | G08B 25/016 |
| 10,085,121 B1 * | 9/2018 | Chokshi | G08B 21/24 |
| 10,303,961 B1 * | 5/2019 | Stoffel | B60Q 9/00 |
| 2011/0313804 A1 | 12/2011 | Camp et al. | |
| 2012/0041675 A1 * | 2/2012 | Juliver | G06Q 30/0283 701/465 |
| 2014/0327518 A1 | 11/2014 | Loutit | |
| 2016/0174023 A1 | 6/2016 | Cavallaro et al. | |
| 2016/0332535 A1 * | 11/2016 | Bradley | B60N 2/002 |
| 2017/0263123 A1 * | 9/2017 | Sachdev | G06K 9/00771 |
| 2018/0075538 A1 | 3/2018 | Konrardy et al. | |
| 2018/0106627 A1 * | 4/2018 | Gupta | H04W 4/48 |
| 2018/0211228 A1 * | 7/2018 | Narayan | H04L 67/10 |
| 2018/0220309 A1 | 8/2018 | Gomes | |
| 2018/0223584 A1 | 8/2018 | Bradley et al. | |

(Continued)

FOREIGN PATENT DOCUMENTS

KR    1020160117975 A    10/2016

OTHER PUBLICATIONS

List of IBM Patents or Patent Applications Treated as Related, filed Jul. 17, 2020.

*Primary Examiner* — David Q Nguyen
(74) *Attorney, Agent, or Firm* — Anthony V England; Edell, Shapiro & Finnan, LLC

(57) ABSTRACT

A method, a system, and a computer program product are provided. At least one processor of a computing device determines that a mobile device remained in a vehicle used in a vehicle for hire service after the vehicle reached a destination. The at least one processor determines at least one second party to notify regarding the mobile device being left in the vehicle based on a use of the vehicle for hire service by a user of the mobile device and the at least one second party. The at least one processor notifies the at least one second party regarding the mobile device being left in the vehicle via at least one device used by the at least one second party.

19 Claims, 8 Drawing Sheets

(56) References Cited

U.S. PATENT DOCUMENTS

| | | |
|---|---|---|
| 2018/0227393 A1 | 8/2018 | Daub |
| 2018/0288568 A1 | 10/2018 | Pao et al. |
| 2018/0293872 A1* | 10/2018 | Guo .................. H04M 1/72527 |
| 2018/0359604 A1 | 12/2018 | Chen et al. |
| 2019/0090094 A1 | 3/2019 | Chokshi et al. |
| 2019/0095714 A1* | 3/2019 | Wilcox ................... G01S 17/89 |
| 2019/0197325 A1 | 6/2019 | Reiley et al. |
| 2019/0206223 A1 | 7/2019 | Hwang et al. |
| 2019/0300020 A1 | 10/2019 | Alexiou et al. |
| 2020/0005044 A1* | 1/2020 | Nakamura ......... G06K 9/00832 |
| 2020/0109957 A1* | 4/2020 | Shiga .................. G01C 21/3438 |
| 2020/0110404 A1* | 4/2020 | Shiga ................... G05D 1/0022 |

* cited by examiner

LOCATING A MOBILE DEVICE AND NOTIFYING A USER OF THE MOBILE DEVICE LOCATION

BACKGROUND

1. Technical Field

Present invention embodiments relate to recovery of a mobile device left behind in a vehicle for hire. More particularly, the present invention embodiments relate to determining that a mobile device of a user of the vehicle for hire was left behind in the vehicle after reaching a destination, determining at least one party to notify regarding the mobile device based on a use of the vehicle for hire service by a user of the mobile device and the at least one party, and notifying the at least one party regarding the mobile device.

2. Discussion of the Related Art

Many users of mobile devices inadvertently leave their mobile devices behind in vehicles for hire upon exiting the vehicles for hire at their destinations. Operators of the vehicles for hire may be unaware that a mobile device was left behind in their vehicles and may not discover the mobile device until hours later. In some cases, a later passenger may discover the mobile device and may take possession of the mobile device upon leaving the vehicle for hire without mentioning a presence of the mobile device to the operator. Even in cases in which an operator discovers the mobile device and a user later realizes that the mobile device was left behind in the vehicle for hire, the user and the operator may not know how to contact each other to arrange for recovery of the mobile device by the user. As a result, the user or his or her business may replace the mobile device at great expense.

In one proposed vehicle for hire service, a user may establish an online account and a user profile. The user profile may include contact information of another party to contact should the user leave his or her mobile device behind in the vehicle after reaching a destination. However, if the contact information of the another party is not kept up-to-date, the contact information may become obsolete, thereby making it impossible to contact the another party.

SUMMARY

According to embodiments of the present invention, a method, a system, and a computer program product provide a notification regarding a mobile device being left behind in a vehicle used in a vehicle for hire service. A determination is made that the mobile device remained in the vehicle used in the vehicle for hire service after the vehicle reached a destination. Another determination is made regarding at least one second party to notify regarding the mobile device being left in the vehicle based on a use of the vehicle for hire service by a user of the mobile device and the at least one second party. The at least one second party is notified regarding the mobile device being left in the vehicle via at least one device used by the at least one second party.

BRIEF DESCRIPTION OF THE DRAWINGS

Generally, like reference numerals in the various figures are utilized to designate like components.

DETAILED DESCRIPTION

Figure 1:
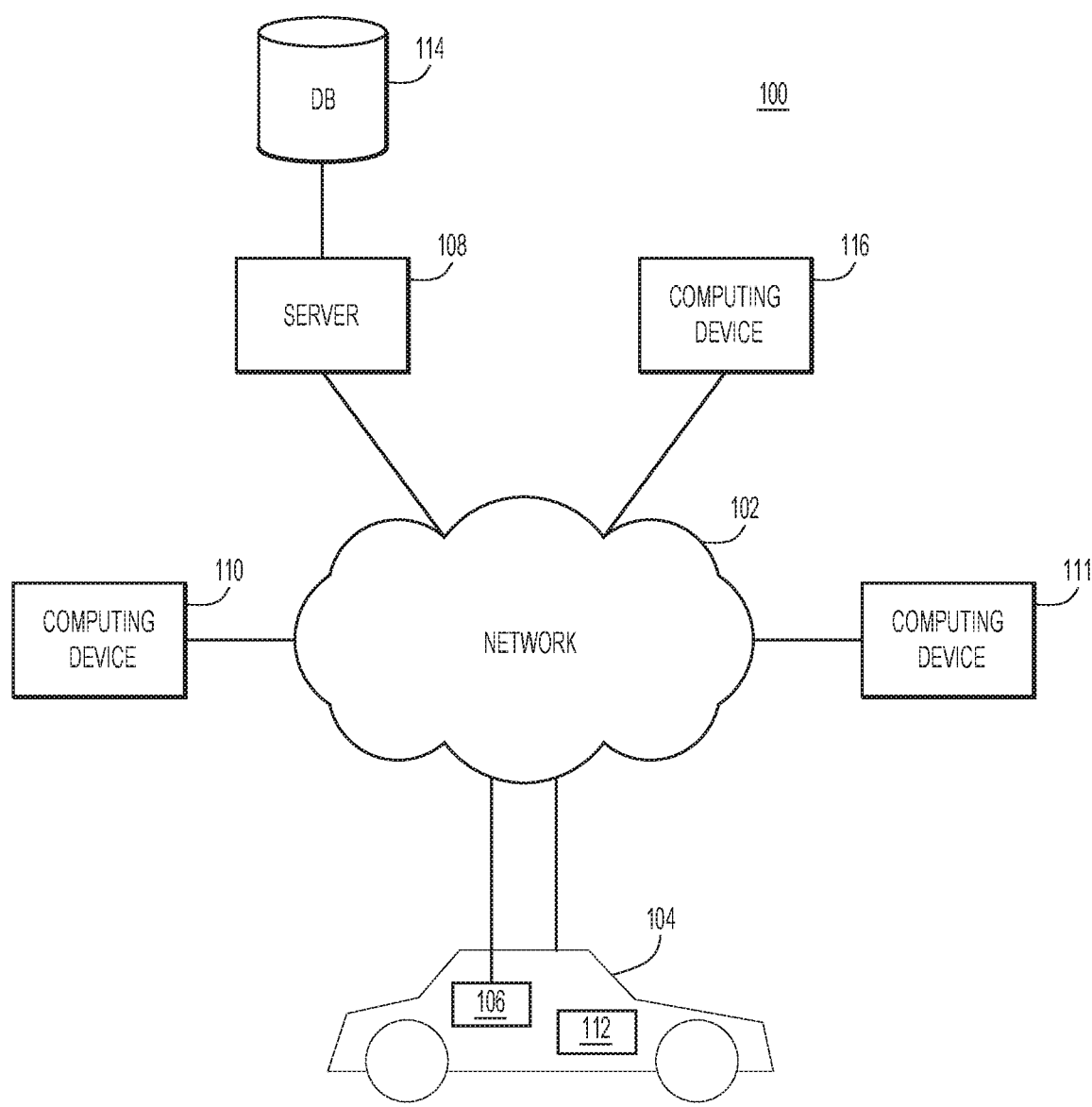
FIG. 1 illustrates an example environment in which embodiments may operate.

In some embodiments, a user who desires a vehicle for hire may use an application executing on a smartphone, a tablet, a laptop, or other mobile or stationary computing device to request a vehicle for hire. The vehicle for hire may be a taxi or an on-demand vehicle for hire. The user may request the vehicle for hire and may provide, to a vehicle for hire service, a destination and either the user may provide or the computing device may automatically provide a pickup location for the user to the vehicle for hire service. Alternatively, instead of using an application, the user may log into the vehicle for hire service via a browser executing on the mobile device or other computing device to request the vehicle for hire.

In this specification, the term, "vehicle for hire service" is to be construed broadly to include a service associated with cars or other vehicles.

After receiving the request, the vehicle for hire service may provide identifying information regarding the driver and the vehicle for hire, as well as an estimated time of arrival, to the user via application, or the browser. Alternatively, the identifying information and the estimated time of arrival may be provided to the user via email, short message service (SMS), or other methods.

After the user is picked up and driven in the vehicle for hire to a destination, the operator of the vehicle for hire may indicate to a server of the vehicle for hire service that the destination has been reached. Alternatively, a vehicle for hire location reporting device may indicate to the server that the destination has been reached. In some embodiments, upon receiving this indication, the server may send a monitoring indication to a mobile device of the user to monitor and report its location to the server for a predefined time period such as, for example, one minute, three minutes, or another time period, provided that the user previously authorized such monitoring.

During this predefined time period, the server may receive location reports from the mobile device and from the vehicle for hire or a mobile device of the operator. If, at the end of the predefined time period, the server determines that the mobile device and the operator or the vehicle for hire are within a threshold distance of each other, then the server may assume that the user left the mobile device behind in the vehicle for hire and may notify one or more of the operator, the user of the mobile device, or one or more other parties regarding the mobile device. The user and/or the one or more other parties may be provided with information regarding the mobile device and contact information for the operator and/or the vehicle for hire service. The operator may be provided with contact information regarding the user and/or the one or more other parties. In some embodiments, the one or more other parties may be determined based on a use of the vehicle for hire service by the user and each of the one or more other parties. In some embodiments, the use may be determined by one or more fee sharing requests made by the user to share a fee with the one or more other parties.

FIG. 1 illustrates an example environment 100 in which the present invention embodiments may operate. Environment 100 may include a network 102, a server 108, a computing device 110, a mobile device 106 in a vehicle for hire 104, and a vehicle for hire location reporting device 112 within vehicle for hire 104. Computing devices 110, 111, 116 and server 108 may be connected to network 102 via a wired or wireless connection. Mobile device 106 and vehicle for hire location reporting device 112 may be connected to network 102 via a wireless connection.

Network 102 may be implemented by any number of any suitable communications media (e.g., wide area network (WAN), local area network (LAN), Internet, Intranet, etc.) or any combination thereof.

Computing devices 110, 111, 116 and server 108 may communicate with each other via network 102. In this specification, a reference to server 108 can be interpreted as referring to either a single server or multiple servers in a server farm.

Mobile device 106 may be a handheld computing device, a tablet computing device, a smartphone, a laptop computing device, or other type of mobile computing device. Mobile device 106 and server 108 may communicate with each other via network 102.

Vehicle for hire location reporting device 112 may include a GPS sensor of an operator of a vehicle for hire or either a fixed or removable location reporting device in vehicle for hire 104. Vehicle for hire location reporting device 112 and server 108 may communicate with each other via network 102.

Database 114 may be implemented by any conventional or other database or storage unit, may be local to or remote from server 108, and may communicate with server 108 via any appropriate communication medium (e.g., local area network (LAN), wide area network (WAN), Internet, hardwire, wireless link, Intranet, etc.).

Server 108, computing devices 110, 111, 116, mobile device 106 and vehicle for hire location reporting device 112 may be implemented by any conventional or other computer system.

Figure 2:
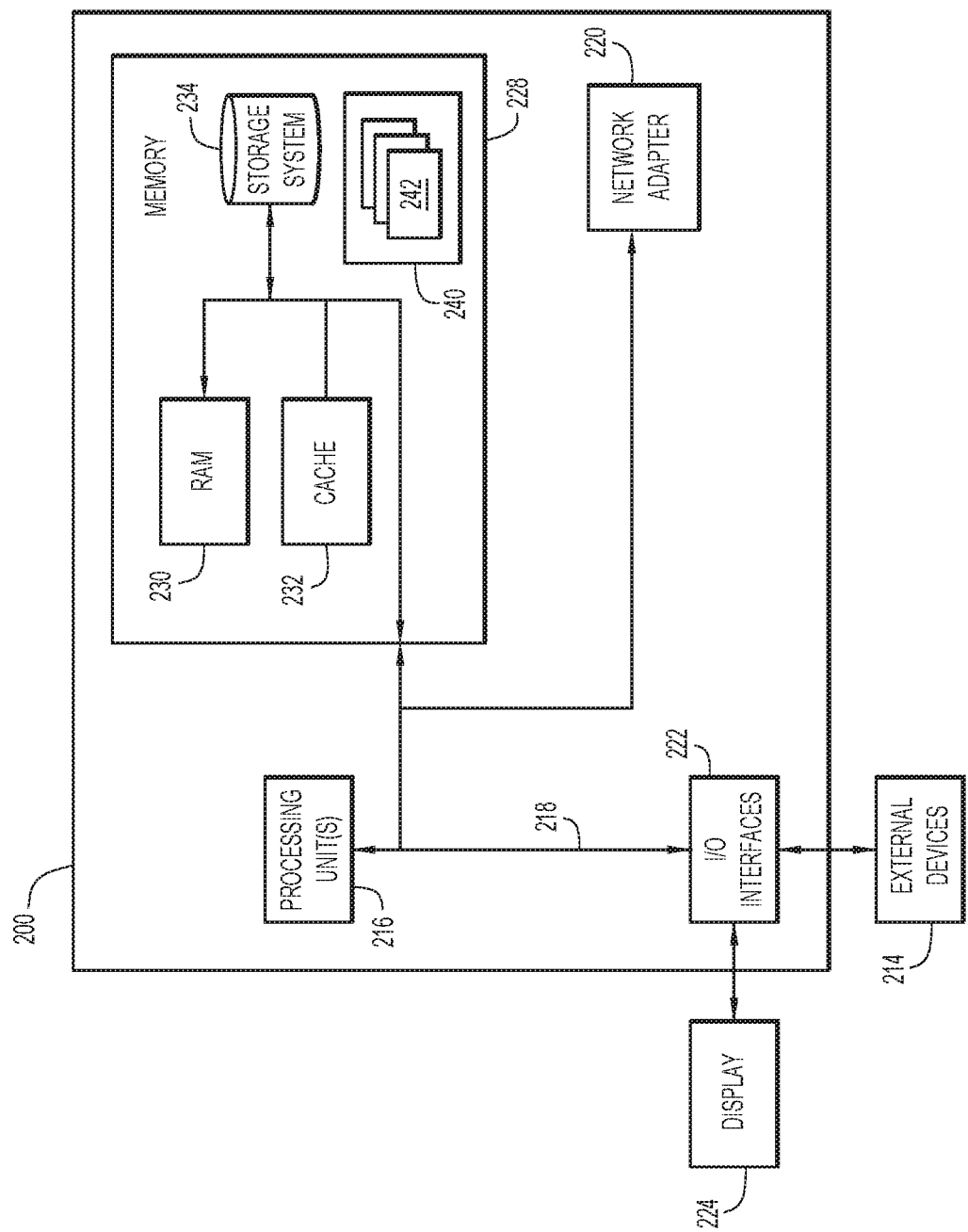
FIG. 2 is a functional block diagram of a computing device that may be used to implement various embodiments.

Referring now to FIG. 2, a schematic of an example computer system 200 is shown, which may implement any of server 108, computing devices 110, 111, 116, mobile device 106 and vehicle for hire location reporting device 112 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
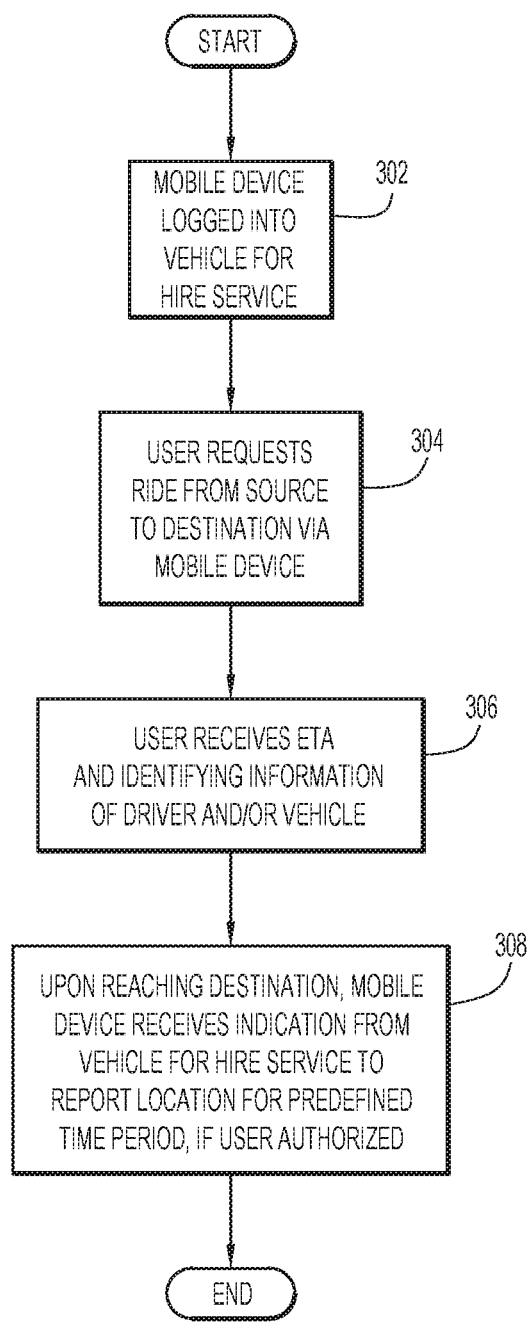
FIG. 3 is a flowchart that illustrates an example process for requesting a vehicle via use of a mobile device according to an embodiment of the present invention.

FIG. 3 is a flowchart illustrating an example process that may be performed on mobile device 106 of a user. The process may begin with a user logging into a vehicle for hire service via mobile device 106 (act 302). The user may log into the vehicle for hire service via an app or an application executing on mobile device 106 and communicating with server 108 via network 102. Alternatively, the user may log into the vehicle for hire service via a web browser executing on mobile device 106 or computing device 110, which communicates with server 108 via network 102.

The user may log into the vehicle for hire service by providing, for example, a user ID and authenticating information associated with a previously established vehicle for hire service account. The authenticating information may include, but not be limited to, a password, a voice of the user, a fingerprint of the user, or a retinal scan of the user. The user may have previously created a user profile associated with the vehicle for hire service account. The user profile may include, but not be limited to, a name of the user, an address of the user, a credit card of the user, a phone number of the user, and contact information for electronically contacting the user. In some embodiments, the user profile may indicate whether or not the user authorizes the vehicle for hire service to track a location of a mobile device of the user for a threshold period of time upon reaching a destination of the user riding in a vehicle of the vehicle for hire service.

When the user is logged into the vehicle for hire service, the user may request a ride by providing a source, or pickup location, and a destination location via the mobile device (act 304). After requesting the ride, the user may receive from the vehicle for hire service an estimated time of arrival (ETA) of a vehicle and identifying information, which may include, but not be limited to, a year, make, model and color of the vehicle, a tag number of the vehicle, a name of an operator of the vehicle, and an image of the operator (act 306).

When the vehicle arrives at the pickup location, the user may enter the vehicle and be driven to the destination provided by the user. Upon reaching the destination, if the user previously authorized tracking of the mobile device, the mobile device may receive an indication to report its location to the vehicle for hire service for a threshold period of time (act 308). The indication may be received by mobile device 106 from server 108 via network 102, or from a device within the vehicle such as, vehicle for hire location reporting device 112 or another device. Alternatively, mobile device 106 may monitor its own location, and upon determining that the mobile device is located within a predefined distance of the destination, begin reporting its own location to server 108. Mobile device 106 may periodically report its location to server 108 every ten seconds or another suitable time interval for a threshold period of time. The threshold period of time may be predefined to be one minute, two minutes, three minutes, or another suitable threshold period of time.

Figure 4:
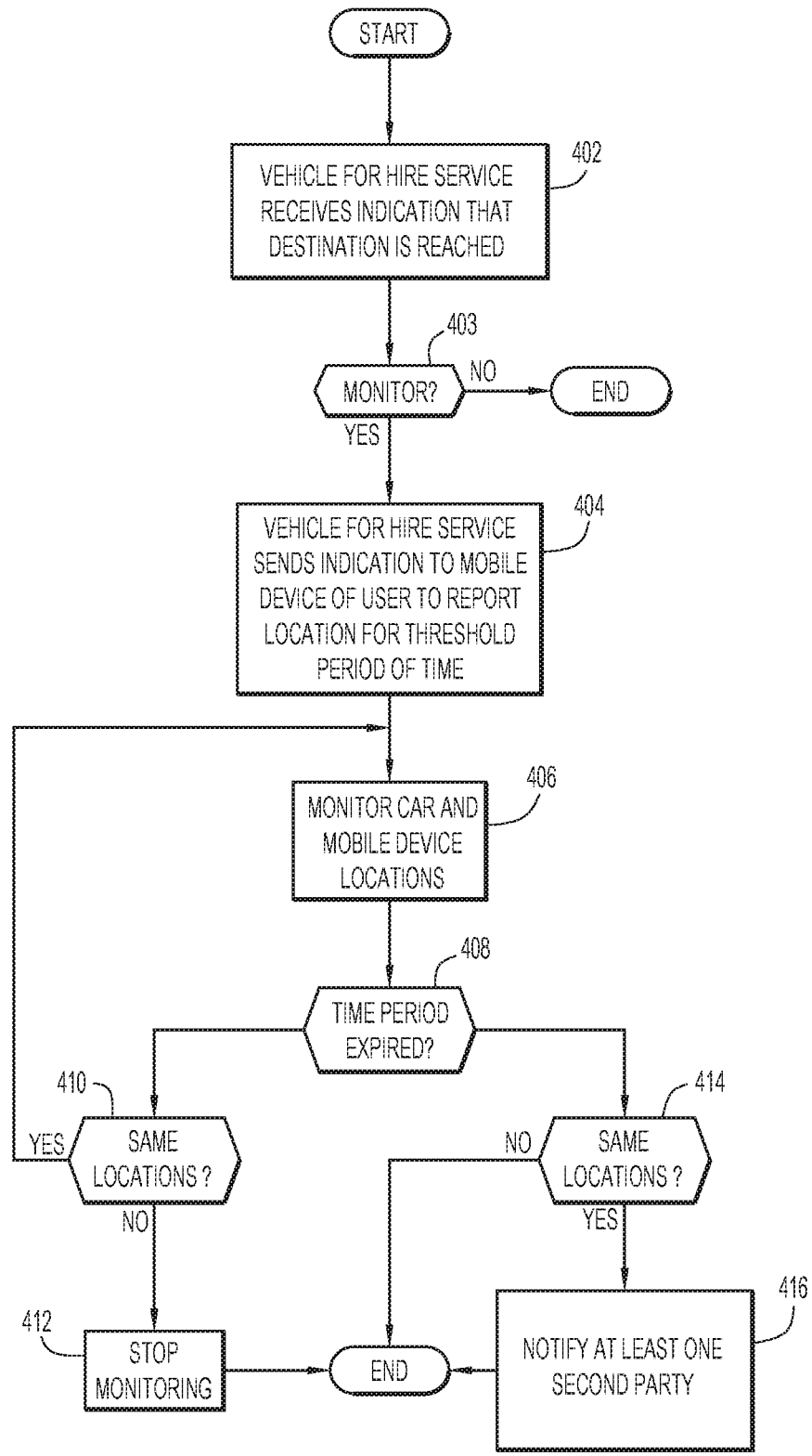
FIG. 4 shows an example process that may be performed when a vehicle for hire, in which a user of a mobile device is riding, has reached a destination according to an embodiment of the present invention.

FIG. 4 is a flowchart of an example process performed by server 108 of a vehicle for hire service. The process may begin with server 108 receiving an indication that a user has just reached a destination via the vehicle for hire service (act 402). Server 108 may then determine whether the user authorized monitoring a location of mobile device 106 for a threshold period of time (act 403). If the user had not authorized the monitoring, then the process is completed.

If, during act 403, server 108 determined that the user had authorized the monitoring of the location of the mobile device, then server 108 may send an indication to mobile device 106 for mobile device 106 to begin reporting its location to server 108 for the threshold period of time (act 404). As previously mentioned, the threshold period of time may be one minute, two minutes, three minutes, or another suitable threshold period of time.

Server 108 may receive location reports from mobile device 106 and vehicle for hire location reporting device 112 (act 406). A determination may be made by server 108 regarding whether the threshold period of time has expired (act 408). If the threshold period of time has been determined not to have expired, then server 108 may determine whether vehicle 104 and mobile device 106 are located within a threshold distance of each other (act 410). If vehicle 104 and mobile device 106 are determined to be within the threshold distance of each other, then acts 406-408 may be repeated. Otherwise, server 108 may stop monitoring the location of mobile device 106 (act 412).

If, during act 408, server 108 determines that the threshold time period has expired, then server 108 may determine whether vehicle 104 and mobile device 106 are within the threshold distance of each other (act 414). If server 108 determines that vehicle 104 and mobile device 106 are not within the threshold distance of each other, then the process may be completed. Otherwise, server 108 may notify one or more of an operator of vehicle 104, a user of mobile device 106, and one or more second parties associated with the user (act 416). According to the various embodiments, one or more second parties may be determined based on the user and the one or more second parties sharing a fee for use of the vehicle for hire service. This may be determined based on a current use of the vehicle for hire service or a purchase history regarding the vehicle for hire service.

In some embodiments, during act 416, server 108 may send an indication to the mobile device 106 to emit a sound to alert the operator of vehicle 104 that the user left mobile device 106 behind when he or she left vehicle 104.

Figure 5:
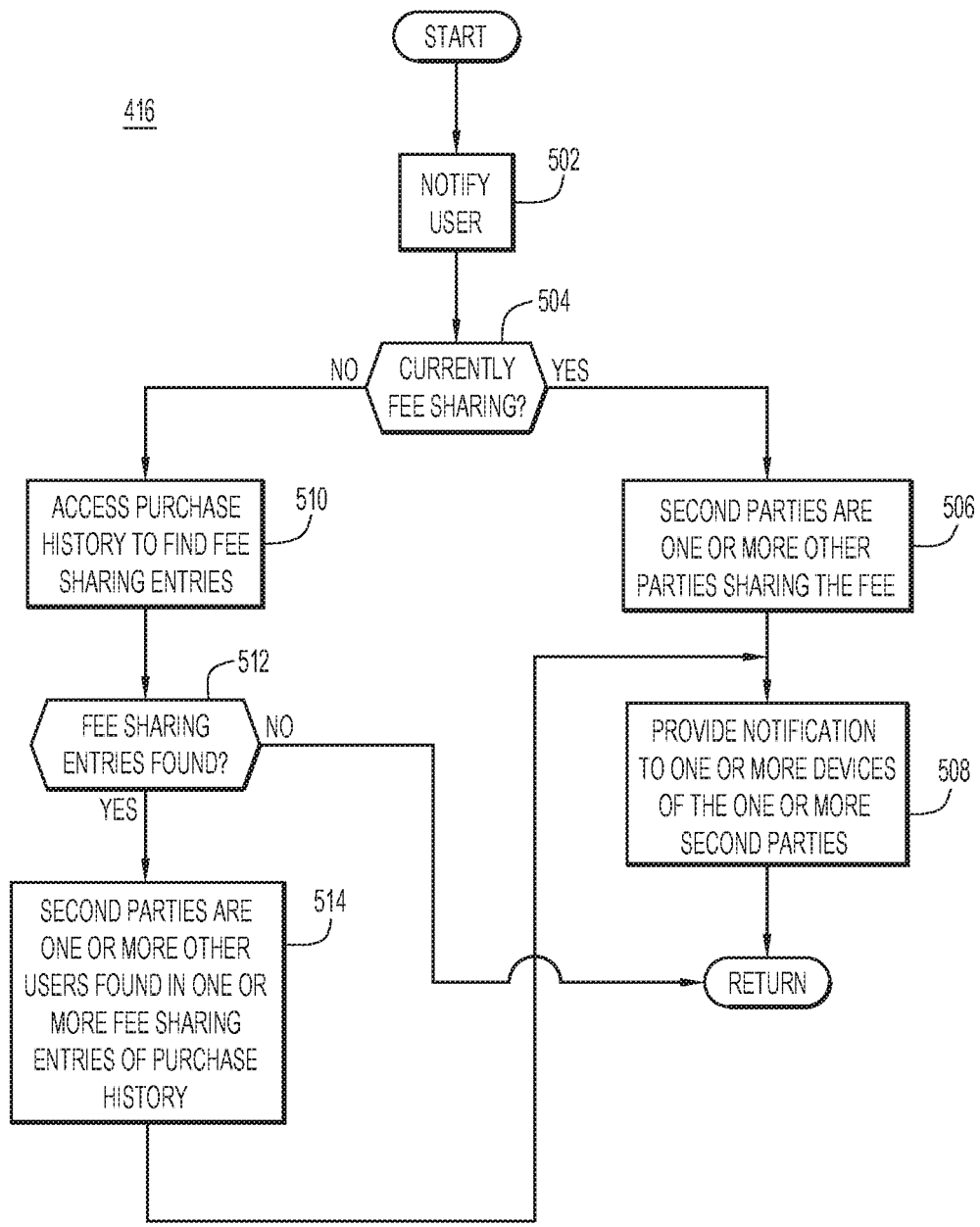
FIG. 5 illustrates an example process, according to embodiments, for providing a notification to a party associated with a user of a mobile device left behind in a vehicle for hire.

FIG. 5 illustrates an example process for performing act 416 to provide a notification to one or more second parties regarding a mobile device of a user being left behind in the vehicle for hire after reaching a destination. The process may begin with a computing device such as, for example, server 108, sending a notification to the user regarding the mobile device (act 502). The notification may be sent to a device of the user via email, text message, or via a login account that the user has with the vehicle for hire service.

Next, server 108 may determine whether a just completed ride of the user via the vehicle for hire service was paid for by sharing a fee for the ride (act 504). If so, then server 108 may determine the one or more second parties to notify as one or more other users who shared the fee for the ride with the user of the left behind mobile device (act 506). Once the one or more second parties are determined, server 108 may provide the notification regarding the mobile device to one or more devices of the one or more second parties (act 508). The notification may be provided via email, text message, a vehicle for hire application executing on a respective device of the one or more second parties, or via another method. The process may then be completed.

If, during act 504, server 108 determines that the just completed ride did not include fee sharing, then server 108 may access a purchase history of the user regarding use of the vehicle for hire service to attempt to find one or more vehicle for hire service purchases in which a fee was shared between the user and at least one other party (act 510). If, during act 512, server 108 determines that such purchases are not found in the purchase history, then the process may be completed. If, during act 512, one or more purchases including fee sharing between the user and at least one other party were found in the purchase history then the at least one other party is determined to be one or more second parties (act 514). Server 108 may then perform act 508 to provide a notification to one or more devices of the one or more second parties as mentioned above, and the process then may be completed.

To request fee sharing for a ride using the vehicle for hire service, after requesting the ride, but before the ride reaches a destination, the user may request fee sharing from a device used for requesting the ride or from a mobile device of the user executing a vehicle for hire application by selecting a payment option to share the fee. The user then may enter a name and/or a phone number of each of one or more other parties who will be sharing the fee. Each of the one or more other parties may then be notified on their respective mobile devices and asked whether he or she accepts the payment option for sharing the fee. The each of the one or more parties may be notified and may respond via a vehicle for hire application executing on his or her respective mobile device, a text message, or via other methods. The user may alternatively enter the name and contact information for one or more other parties sharing the ride (without fee sharing) to receive notifications.

In some embodiments, the one or more other parties may have previously created an online account with the vehicle for hire service, which includes a user profile. The user profile may include, but not be limited to, a name, information regarding one or more credit cards, one or more phone numbers, an email address, and whether location tracking of a mobile device is authorized.

Figure 6:
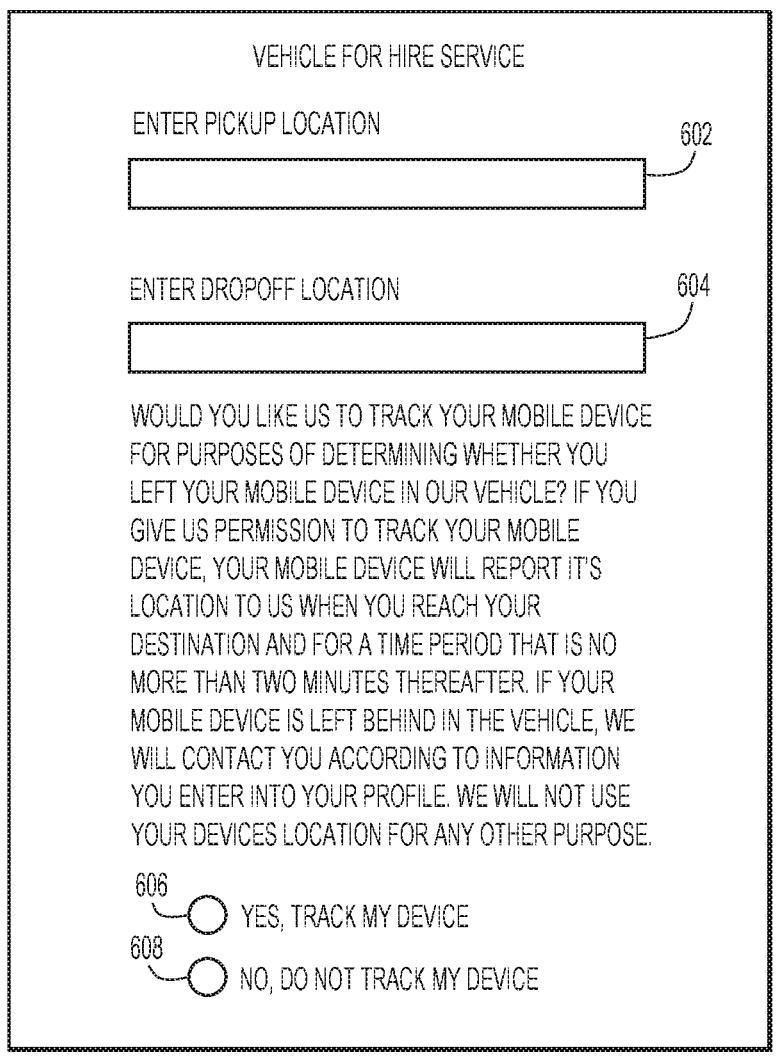
FIG. 6 shows an example display screen for a user to provide information for requesting a vehicle from a vehicle for hire service according to various embodiments.

FIG. 6 shows an example display screen 600, which may be displayed to a user when requesting a ride from a vehicle for hire service. A user may execute a vehicle for hire application on a computing device or may use a web browser to access a vehicle for hire service. In some embodiments, a user may login to his or her vehicle for hire service account by providing, for example, a user ID and a password. After logging in, display screen 600 may be displayed by the vehicle for hire application or via the web browser executing on the user's device. The user may enter a pickup location 602 and a dropoff location 604 on display screen 600, thereby requesting a ride from the vehicle for hire service. The user may also indicate whether permission is given to the vehicle for hire service to track a mobile device of the user by selecting indicator 606 or indicator 608 on display screen 600. Various embodiments may determine whether a user left a mobile device in a vehicle of the vehicle for hire service only if permission is given to the vehicle for hire service to track a location of the mobile device of the user.

Figure 7:
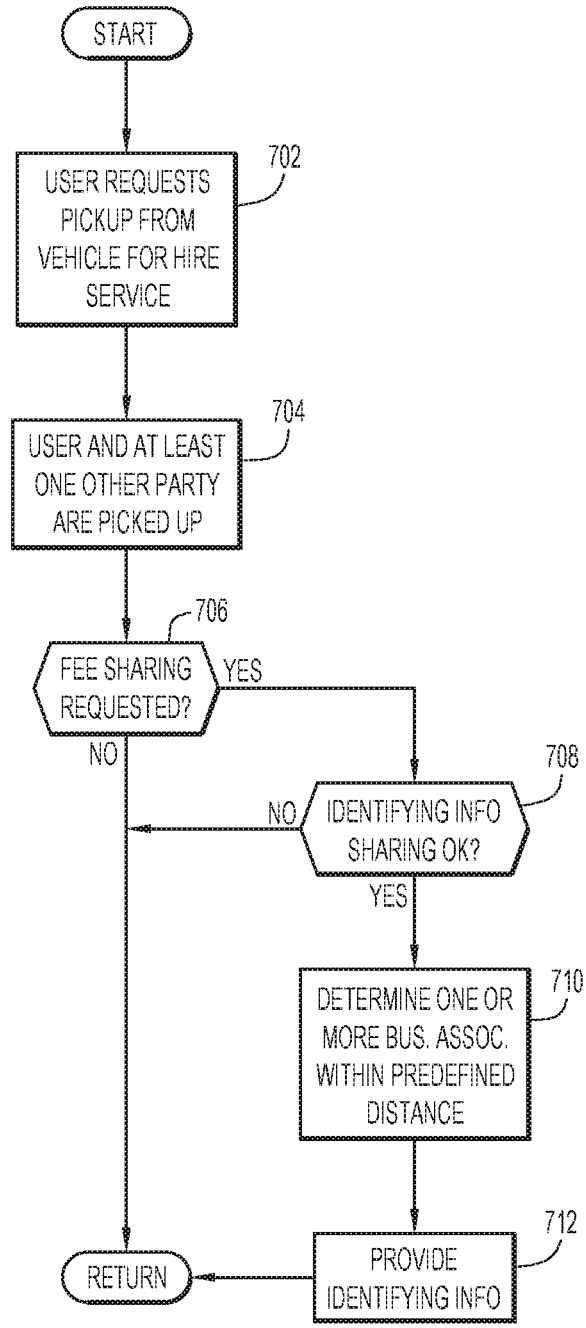
FIG. 7 illustrates is a flowchart that illustrates an example process, according to various embodiments, for a sharing identifying information of users of the vehicle for hire service who are splitting a fee.

FIG. 7 is a flowchart illustrating an example process that may be performed, according to some embodiments, for sharing identifying information of one or more users of the vehicle for hire service with one or more business associates of the vehicle for hire service. The process may begin with a user requesting a pickup from a vehicle for hire service (act 702). When the vehicle from the vehicle for hire service arrives, the user and at least one other party are picked up and enter the vehicle (act 704). Sometime during a ride in the vehicle, the user may request fee sharing via a mobile device of the user. If the user requested fee sharing during the ride, and each of the at least one other party authorized the fee sharing (act 706), then server 108 may determine whether the user and the each of the at least one other party authorized sharing of identifying information by the vehicle for hire service with business associates of the vehicle for hire service (act 708).

In various embodiments, the identifying information may include, but not be limited to, user IDs of the user and the each of the at least one other party regarding the respective accounts with the vehicle for hire service. In these various embodiments, the user and the each of the at least one other party previously established an online account with the vehicle for hire service. Each account may include a corresponding user profile with information about the user, which may include, but not be limited to, a name, a user ID, a mobile phone number, a home phone number, a residential address, credit card information, and whether the user authorizes sharing of his or her identifying information with the one or more business associates of the vehicle for hire service.

If, during act 708, server 108 determines that the user and the at least one other party authorized sharing of identifying information, then server 108 may determine one or more business associates having a business establishment within a predefined distance of the destination (act 710) and may provide the identifying information to computing devices or servers associated with the determined one or more business associate (act 712). As an example, if the destination is within a predefined distance of a sports stadium and a team associated with the sports stadium is a business associate of the vehicle for hire service, then the identifying information of the user and the at least one other party may be provided to computing devices associated with the team. Similarly, if a restaurant or a movie theater is located within the predefined distance of the destination, the identifying information of the user and the at least one other party may be provided to computing devices associated with the restaurant or the movie theater. The process then may be completed.

In an alternate embodiment, assuming that permission is given to share the identifying information of the user and the at least one other party, instead of determining the one or more business associates within a predefined distance of a destination, server 108 may determine the one or more business associates within a predefined distance of a pickup location, or within a predefined distance of anywhere along a route of a ride of the user and the at least one other party in the vehicle of the vehicle for hire service.

In the various embodiments, the one or more business associates of the vehicle for hire service may receive the identifying information, and may create and provide marketing information, a coupon, an offer, or advertisements, for their respective businesses to a computing device such as, for example, server 108 of the vehicle for hire service. The provided marketing information, a coupon, an offer, or advertisements, may be included in one or more communications from a computing device associated with the one of the one or more business associates, along with the identifying information, to server 108, which may further provide the marketing information, the coupon, the offer, or the advertisements to one or more users corresponding to the identifying information included in the communication.

Figure 8:
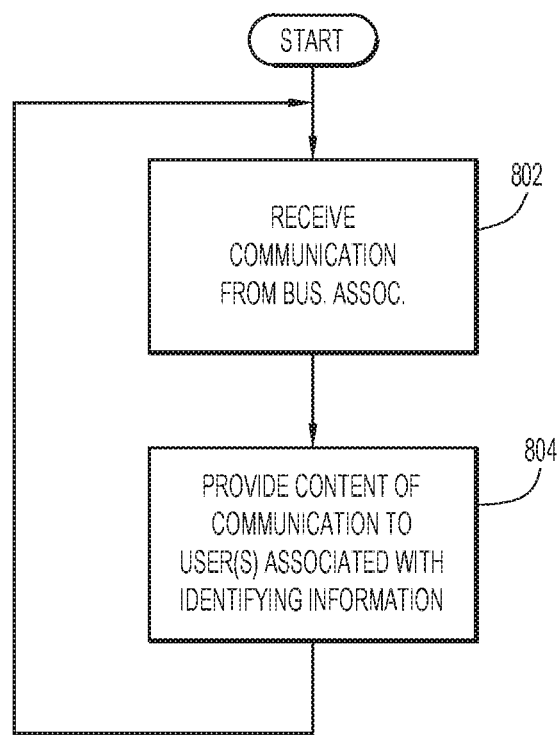
FIG. 8 shows a flowchart of an example process, according to some embodiments, for receiving a communication from a business associate of a vehicle for hire service and providing content of the communication to one or more users of the vehicle for hire whose identifying information was provided to the business associate based on fee sharing regarding the vehicle for hire service.

FIG. 8 is a flowchart that illustrates an example process that may be performed by server 108 in some embodiments. Server 108 may receive a communication from a computing device associated with a business associate of the vehicle for hire service (act 802). The communication may include identifying information previously provided to the business associate by server 108 and may further include content such as, for example, marking information or advertisements regarding a business of the business associate. Server 108 may access one or more respective user profiles corresponding to the received identifying information included in the communication and may deliver the marketing information, the coupon, the offer, or the advertisements to users corresponding to the received identifying information according to respective users preferences as may be indicated in their user profiles (act 804). For example, the marketing information, the coupon, the offer, or the advertisements may be provided to the user via the vehicle for hire application executing on the user's computing device, may be provided to the user via an email address included in the user's profile, may be provided to the user via a short message service (SMS) message to a mobile phone number included in the user's user profile, or via another method.

In an alternate embodiment, the identifying information provided to the computing devices of the business associates may include, but not be limited to, one or more of a user's email address and a user's mobile phone number for receiving SMS messages. In this alternate embodiment, computing devices of the business associate may send the marketing information, the coupon, the offer, or the advertisements using the email addresses and/or the mobile phone numbers for the SMS messages without having to provide communications including the marketing information, the coupon, the offer, or the advertisements to server 108.

The environment of the present invention embodiments may include any number of computer or other processing systems (e.g., client or end-user systems, server systems, etc.) and databases or other repositories arranged in any desired fashion, where the present invention embodiments may be applied to a number of desired types of computing environment (e.g., cloud computing, client-server, network computing, mainframe, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method of providing a notification regarding a mobile device being left in a vehicle used in a vehicle for hire service, the method comprising:
    monitoring, by at least one processor of a computing device, first location reports from the mobile device reporting a location of the mobile device and second location reports from a vehicle location reporting device reporting a location of the vehicle, the monitoring occurring for a threshold period of time upon receiving an indication that the vehicle reached a destination;
    comparing, by the at least one processor, the reported location of the mobile device with the reported location of the vehicle;
    determining, by the at least one processor, that a user of the mobile device left the mobile device in the vehicle used in the vehicle for hire service after the vehicle reached a destination when a result of the comparing indicates that the mobile device and the vehicle were within a threshold distance of each other for the threshold period of time;
    determining, by the at least one processor, at least one second party to notify regarding the mobile device being left in the vehicle based on a use of the vehicle for hire service by the user of the mobile device and the at least one second party; and
    notifying, by the at least one processor, the at least one second party regarding the mobile device being left in the vehicle via at least one device used by the at least one second party.

2. The method of claim 1, wherein the determining the at least one second party to notify further comprises:
    determining, by the at least one processor, that the user and the at least one second party are sharing a fee for a current use of the vehicle for hire service.

3. The method of claim 2, further comprising:
    providing respective identifying information of the user and the at least one second party to one or more computing devices associated with at least one business associate having a respective business location within a predefined distance of one from a group of a vehicle for hire service pickup location, the destination, and a route of the current use of the vehicle for hire service.

4. The method of claim 3, further comprising:
    receiving, by the at least one processor, a communication on behalf of the at least one business associate, the communication including the respective identifying information of the user and the at least one second party and further includes one from a group of an advertisement, a coupon, and an offer regarding a business of the at least one business associate; and
    presenting, by the at least one processor, the one from the group of the advertisement, the coupon, and the offer to the user and the at least one second party.

5. The method of claim 4, wherein the presenting further comprises:
    sending the one from the group of the advertisement, the coupon, and the offer to respective devices of the user and the at least one second party for presentation via an application, associated with the vehicle for hire service, executing on the respective devices.

6. The method of claim 4, wherein the presenting further comprises:
    sending the one from the group of the advertisement, the coupon, and the offer to respective devices of the user and the at least one second party for presentation via one from a group of an email application and a text messaging application executing on the respective devices.

7. The method of claim 1, wherein the determining the at least one second party to notify further comprises:
    finding one or more entries in a purchase history of the user, with respect to the vehicle for hire service, indicating that the user and the at least one second party shared a fee for use of the vehicle for hire service.

8. A system for providing a notification regarding a mobile device being left in a vehicle used in a vehicle for hire service, the system comprising:
    at least one processor; and
    a memory connected with the at least one processor, wherein the at least one processor is configured to perform:
        monitoring first location reports from the mobile device reporting a location of the mobile device and second location reports from a vehicle location reporting device reporting a location of the vehicle, the monitoring occurring for a threshold period of time upon receiving an indication that the vehicle reached a destination;
        comparing the reported location of the mobile device with the reported location of the vehicle;
        determining that a user of the mobile device left the mobile device in the vehicle used in the vehicle for hire service after the vehicle reached a destination when a result of the comparing indicates that the mobile device and the vehicle were within a threshold distance of each other for the threshold period of time,
        determining at least one second party to notify regarding the mobile device being left in the vehicle based on a use of the vehicle for hire service by the user of the mobile device and the at least one second party, and
        notifying the at least one second party regarding the mobile device being left in the vehicle via at least one device used by the at least one second party.

9. The system of claim 8, wherein the determining the at least one second party to notify further comprises:
    determining that the user and the at least one second party are sharing a fee for a current use of the vehicle for hire service.

10. The system of claim 9, wherein the at least one processor is further configured to perform:

providing respective identifying information of the user and the at least one second party to one or more computing devices associated with at least one business associate having a respective business location within a predefined distance of one from a group of a vehicle for hire service pickup location, the destination, and a route of the current use of the vehicle for hire service.

11. The system of claim 10, wherein the at least one processor is further configured to perform:
receiving a communication on behalf of the at least one business associate, the communication including the respective identifying information of the user and the at least one second party and further includes one from a group of an advertisement, a coupon, and an offer regarding a business of the at least one business associate; and
presenting the one from the group of the advertisement, the coupon, and the offer to the user and the at least one second party.

12. The system of claim 11, wherein the at least one processor is further configured to perform:
sending the one from the group of the advertisement, the coupon, and the offer to respective devices of the user and the at least one second party for presentation via an application, associated with the vehicle for hire service, executing on the respective devices.

13. The system of claim 11, wherein the at least one processor is further configured to perform:
sending the one from the group of the advertisement, the coupon, and the offer to respective devices of the user and the at least one second party for presentation via one from a group of an email application and a text messaging application executing on the respective devices.

14. The system of claim 8, wherein the determining the at least one second party to notify further comprises:
finding one or more entries in a purchase history of the user, with respect to the vehicle for hire service, indicating that the user and the at least one second party shared a fee for use of the vehicle for hire service.

15. A computer program product device for providing a notification regarding a mobile device being left in a vehicle used in a vehicle for hire service, the computer program product device comprising one or more computer readable storage media having program instructions collectively stored on the one or more computer readable storage media, the program instructions executable by a computer to cause the computer to:
monitor first location reports from the mobile device reporting a location of the mobile device and second location reports from a vehicle location reporting device reporting a location of the vehicle, the monitoring occurring for a threshold period of time upon receiving an indication that the vehicle reached a destination;
compare the reported location of the mobile device with the reported location of the vehicle;
determine that a user of the mobile device left the mobile device in the vehicle used in the vehicle for hire service after the vehicle reached a destination when a result of the comparing indicates that the mobile device and the vehicle were within a threshold distance of each other for the threshold period of time;
determine at least one second party to notify regarding the mobile device being left in the vehicle based on a use of the vehicle for hire service by the user of the mobile device and the at least one second party; and
notify the at least one second party regarding the mobile device being left in the vehicle via at least one device used by the at least one second party.

16. The computer program product device of claim 15, wherein the program instructions being executable to cause the computer to determine the at least one second party to notify further comprises program instructions to cause the computer to:
determine that the user and the at least one second party are sharing a fee for a current use of the vehicle for hire service.

17. The computer program device product of claim 15, wherein the program instructions being executable to cause the computer to determine the at least one second party to notify further comprises program instructions to cause the computer to:
find one or more entries in a purchase history of the user, with respect to the vehicle for hire service, indicating that the user and the at least one second party shared a fee for use of the vehicle for hire service.

18. The computer program product device of claim 15, wherein the program instructions being executable to cause the computer to determine the at least one second party to notify further comprises program instructions to cause the computer to:
provide respective identifying information of the user and the at least one second party to one or more computing devices associated with at least one business associate having a respective business location within a predefined distance of one from a group of a vehicle for hire service pickup location, the destination, and a route of the current use of the vehicle for hire service.

19. The computer program product device of claim 18, wherein the program instructions being executable to cause the computer to:
receive a communication on behalf of the at least one business associate, the communication including the respective identifying information of the user and the at least one second party and further includes one from a group of an advertisement, a coupon, and an offer regarding a business of the at least one business associate; and
send the one from the group of the advertisement, the coupon, and the offer to respective devices of the user and the at least one second party for presentation via an application executing on the respective devices, wherein
the application includes one of an application associated with the vehicle for hire service, an email application, and a text messaging application.

* * * * *